(12) United States Patent
Clement et al.

(10) Patent No.: US 7,203,703 B2
(45) Date of Patent: Apr. 10, 2007

(54) METHODS AND APPARATUS FOR PROVIDING ON-THE-JOB PERFORMANCE SUPPORT

(75) Inventors: Gary L. Clement, Waterford, MI (US); Irvin Andrew Teasdale, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 457 days.

(21) Appl. No.: 10/059,074

(22) Filed: Jan. 28, 2002

(65) Prior Publication Data

US 2002/0116388 A1 Aug. 22, 2002

Related U.S. Application Data

(60) Provisional application No. 60/264,782, filed on Jan. 29, 2001.

(51) Int. Cl.
*G06F 17/00* (2006.01)
*G06F 17/30* (2006.01)

(52) U.S. Cl. .................. 707/104.1; 707/1; 345/530
(58) Field of Classification Search ............. 345/700, 345/705, 530, 553; 705/1, 8, 50, 51; 701/29; 707/1, 104.1, 10, 100

See application file for complete search history.

(56) References Cited

U.S. PATENT DOCUMENTS

| 6,188,402 | B1* | 2/2001 | Csipkes et al. | 345/705 |
| 6,594,561 | B2* | 7/2003 | Martin et al. | 701/29 |
| 2003/0055812 | A1* | 3/2003 | Williams et al. | 707/1 |
| 2004/0059613 | A1* | 3/2004 | Ford et al. | 705/8 |

* cited by examiner

*Primary Examiner*—Sam Rimell
(74) *Attorney, Agent, or Firm*—Christopher DeVries (57) ABSTRACT

Method and apparatus are provided for job performance support. The apparatus for providing on-the-job performance support of a procedure comprises a memory configured to store performance support data. The performance support data comprises action data, resource data, reference data, procedure data, and assembly data. The apparatus further comprises a processor coupled to the memory and a display coupled to the processor. The processor is configured to access the memory, retrieve the performance support data, and assemble the performance support data to form the procedure. The display is configured to produce a Graphical User Interface (GUI) that visually presents the procedure assembled by the processor. The display is further configured to produce the GUI that visually presents an administrator interface. The administrator interface is configured to provide for the creation and modification of the action data, resource data, reference data, procedure data, and assembly data with a menu driven environment operating in conjunction with a browser of the first network.

16 Claims, 9 Drawing Sheets

User Interface

Home　Back　Main Menu　Logout　My Toolkit　Wireless and Voice　Print　Let's Talk　My Notes　Help Main | Examples | Brake Service | Lining Replcmnt All Steps　Step by Step　Quick Step　Edit Lining Replcmnt :Brake Lining Replacement ~51

Details

1. REMOVE TWO-THIRDS OF THE BRAKE FLUID FROM THE MASTER CYLINDER ~63
   THE BRAKE FLUID CONTAINER SHOULD HAVE A GRADUATED SCALE PROVIDING THE TOTAL VOLUME AND PERCENTAGE OF THE TOTAL VOLUME. YOU MAY CLEAN THE SURFACE TO SEE THE SCALE. ~44
2. MARK THE RELATIONSHIP OF THE WHEEL TO THE HUB. ~53
3. RAISE THE VEHICLE AND SUPPORT IT WITH SUITABLE SAFETY STANDS ~55
4. REMOVE WHEEL AND TIRE ASSEMBLY, REFER TO WHEELS AND TIRES ~57

Details　Procedure

5. POSITION A C-CLAMP AROUND THE OUTER PAD AND CALIPER AND TIGHTEN UNTIL THE PISTON BOTTOMS IN ITS BORE ~31
   ▲Info　Image Details 6. REMOVE MOUNTING BOLTS ~59
   Image Search Revision Date

WORKPLACE ASSISTANT. GM

METHODS AND APPARATUS FOR PROVIDING ON-THE-JOB PERFORMANCE SUPPORT

CROSS-REFERENCE TO RELATED APPLICATION

This application claims the benefit of U.S. Provisional Application No. 60/264,782 filed Jan. 29, 2001.

TECHNICAL FIELD

The present invention generally relates to on-the-job performance support, and more particularly to methods and apparatus for providing on-the-job performance support of a procedure. More specifically, the present invention relates to methods and apparatus for providing on-the-job and on-demand performance support via a Graphical User Interface (GUI) that is generated under the control of a processor in operable communication with memory that stores performance support data, which is preferably dynamic performance support data (i.e., methods and apparatus for providing on-the-job and on-demand performance via a computer and GUI in communication with a dynamic database).

BACKGROUND OF THE INVENTION

Employee movement, absenteeism and attrition in the work environment can result in the loss of technical memory and skills. Performance support is not generally available at the location where such performance support is needed and at the times when individuals such as employees, contractors, and consultants need such performance support. While technical memory and skills can be provided to individuals during periodically and scheduled programs, the accumulated technical memory and skills from these programs quickly dissipate without reinforcement through actual performance.

In addition to employee movement, absenteeism, attrition, and the unavailability of performance support at times and places of need, loss of technical memory and skills also results from a lack of communication between individual employees, groups, departments, facilities and divisions as a common conduit is generally unavailable to share technical memory and skills between these individuals and/or entities. Furthermore, documentation, prints and process information can be in a constant state of flux, which makes it difficult to track and keep any shared information up-to-date at the locations where such information is needed and at the times when such performance support is needed by the individuals of groups, departments, facilities, divisions, and subsidiaries, for example.

In view of the foregoing, it should be appreciated that it would be desirable to promote the development of unique solutions within a common framework of philosophies, methods, media and tools and also provide a conduit of information for promoting a common environment between individuals and groups of individuals such as departments, facilities, divisions, which support the development of knowledgeable workers to maintain, gain, or increase a competitive edge in the marketplace. It should also be appreciated that is would be desirable to provide an easy to use, on-demand job performance support tool (i.e., methods and apparatus for providing on-the-job performance support to effectively and accurately perform a given task). Furthermore, additional desirable features will become apparent to one skilled in the art from the foregoing background of the invention and following summary, brief description of the drawings, detailed description of the drawings, appended claims, and the abstract.

SUMMARY OF THE INVENTION

In accordance with the teachings of the present invention, methods and apparatus are provided for on-the-job performance support of a procedure. The apparatus for providing on-the-job performance support of a procedure comprises a memory configured to store performance support data. The performance support data comprises action data, resource data, reference data, procedure data, and assembly data. The apparatus further comprises a processor coupled to the memory and a display coupled to the processor. The processor is configured to access the memory, retrieve the performance support data, and assemble the performance support data to form the procedure. The display is configured to produce a Graphical User Interface (GUI) that visually presents the procedure assembled by the processor. The display is further configured to produce the GUI that visually presents an administrator interface. The administrator interface is configured to provide for the creation and modification of the action data, resource data, reference data, procedure data, and assembly data with a menu driven environment operating in conjunction with a browser of the first network.

The method for providing on-the-job performance support of a procedure comprises storing performance support data in a memory with the performance support data comprising action data, resource data, reference data, procedure data, and assembly data. The method also comprises retrieving the performance support data from the memory through a first network, assembling the performance support data to form the procedure, and producing a Graphical User Interface (GUI) that visually presents the procedure assembled from the performance support data to form the procedure. In addition, the method comprises producing the GUI that visually presents an administrator interface that is configured to provide for the creation and modification of the action data, resource data, reference data, procedure data, and assembly data with a menu driven environment operating in conjunction with a browser of the first network.

BRIEF DESCRIPTION OF THE DRAWINGS

The present invention will hereinafter be described in conjunction with the appended drawing figures, wherein like numerals denote like elements, and.

DESCRIPTION OF THE PREFERRED EMBODIMENT

The following detailed description of the drawings is exemplary in nature and is not intended to limit the invention or the application or use of the invention. Furthermore, there is no intention to be bound by any theory presented in this detailed description of the drawings.

Figure 1:
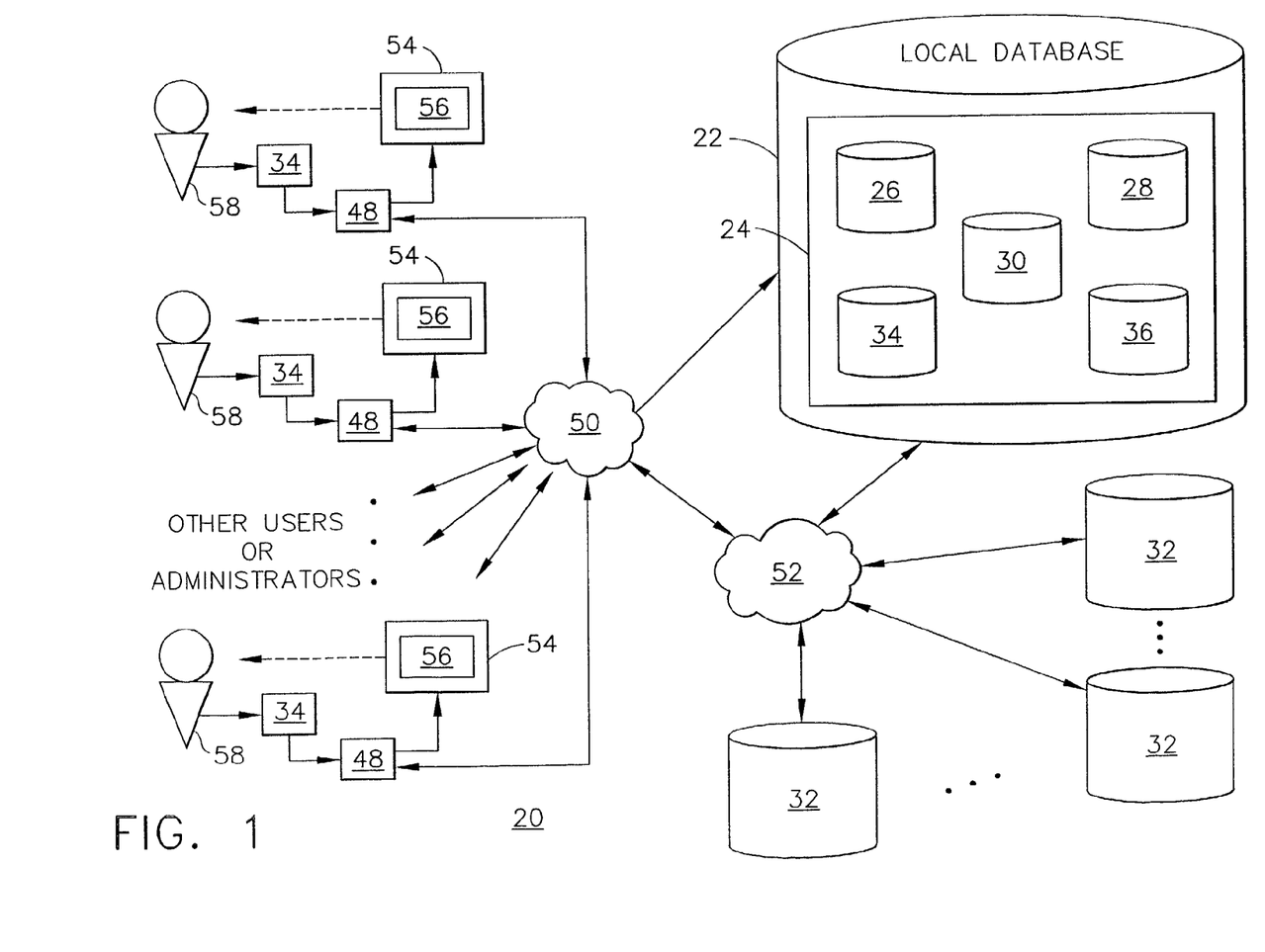
FIG. 1 is an apparatus for providing on-the-job performance support of a procedure according to a preferred exemplary embodiment of the present invention.

Referring to FIG. 1, an apparatus 20 is illustrated for providing on-the-job performance support of a procedure according to a preferred exemplary embodiment of the present invention. As used herein, "performance support" is the capture, storage, and distribution of individual knowledge assets and/or corporate knowledge assets, and preferably the electronic capture, storage, and distribution of individual knowledge assets and/or corporate knowledge assets. The apparatus 20, which shall also be referred to herein as Workplace Assistant™, and the methods of the present invention, provide a web-based utility that supports workplace performance for one or more persons and/or one or more entities with a means of documenting, updating, and accessing work or job procedures through on-the-job and on-demand performance support via a network (i.e., intranet and/or internet).

The apparatus 20 and the methods of the present invention, provide on-the-job and on-demand support in a simple to use and simple to update manner with an embedded performance support enhancement having a common interface capable of supporting multiple multimedia formats. The apparatus 20 and the methods of the present invention thereby provide such desirable advantages as reinforcement of accumulated technical memory and skills, facilitation of communication about processes and equipment, and support of international standards, including the support of international standards developed by standardization organizations such as the International Organization for Standardization (ISO) (e.g., ISO 9000). However, one of ordinary skill in the art should be able recognize that numerous advantages exist in addition to those specifically identified in the background of the invention, summary, brief description of the drawings, detailed description of the drawings, claims, and abstract.

In order to provide such desirable advantages, the apparatus 20 is configured to provide on-the-job performance support of a procedure. As used herein, "on-the-job" shall mean generally accessible to one or more persons and/or entities at the location of the procedure and generally on an on-demand basis. The apparatus 20 can be configured to provide on-the-job performance support of any number of procedures. For example, the procedure can be an assembly procedure, repair procedure, reconstruction procedure, maintenance, manufacturing procedure, cleaning procedure, design procedure, accounting procedure, marketing procedure, finance procedure, banking procedure, regulatory procedure, inventory procedure, engineering procedure, disassembly produce, and the like.

The apparatus 20 for providing on-the-job performance support of a procedure comprises a memory 22 that is configured to store performance support data 24, and according to one exemplary embodiment of the present invention, the memory is organized with one or more databases containing the performance support data 24. The performance support data 24 comprises action data 26, resource data 28, reference data 30. In addition, the performance support data 24 comprises procedure data 34, and assembly data 36.

Figure 2:
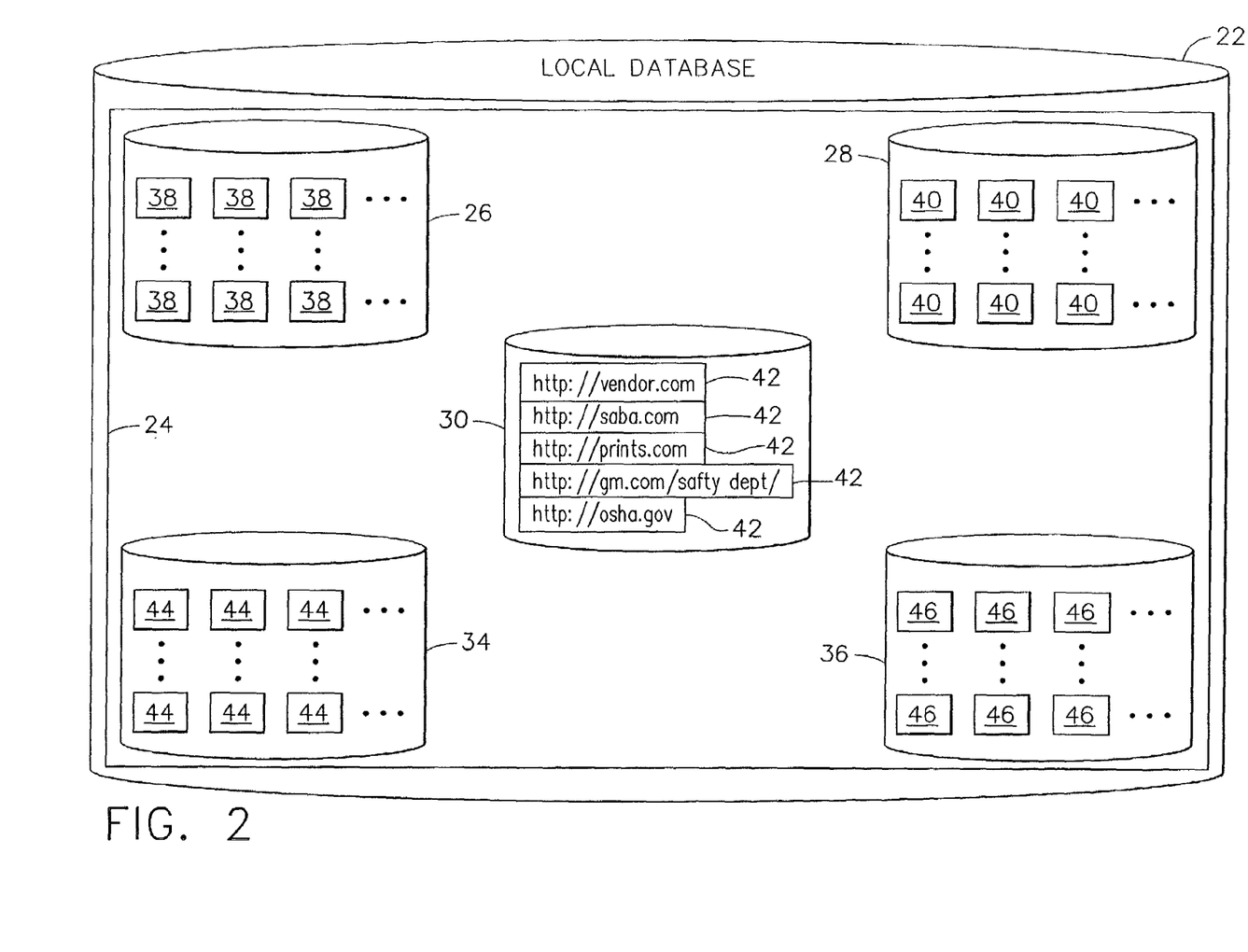
FIG. 2 is the memory of FIG. 1 in greater detail that is configured to store the performance support data according to a preferred exemplary embodiment of the present invention.
Figure 3:
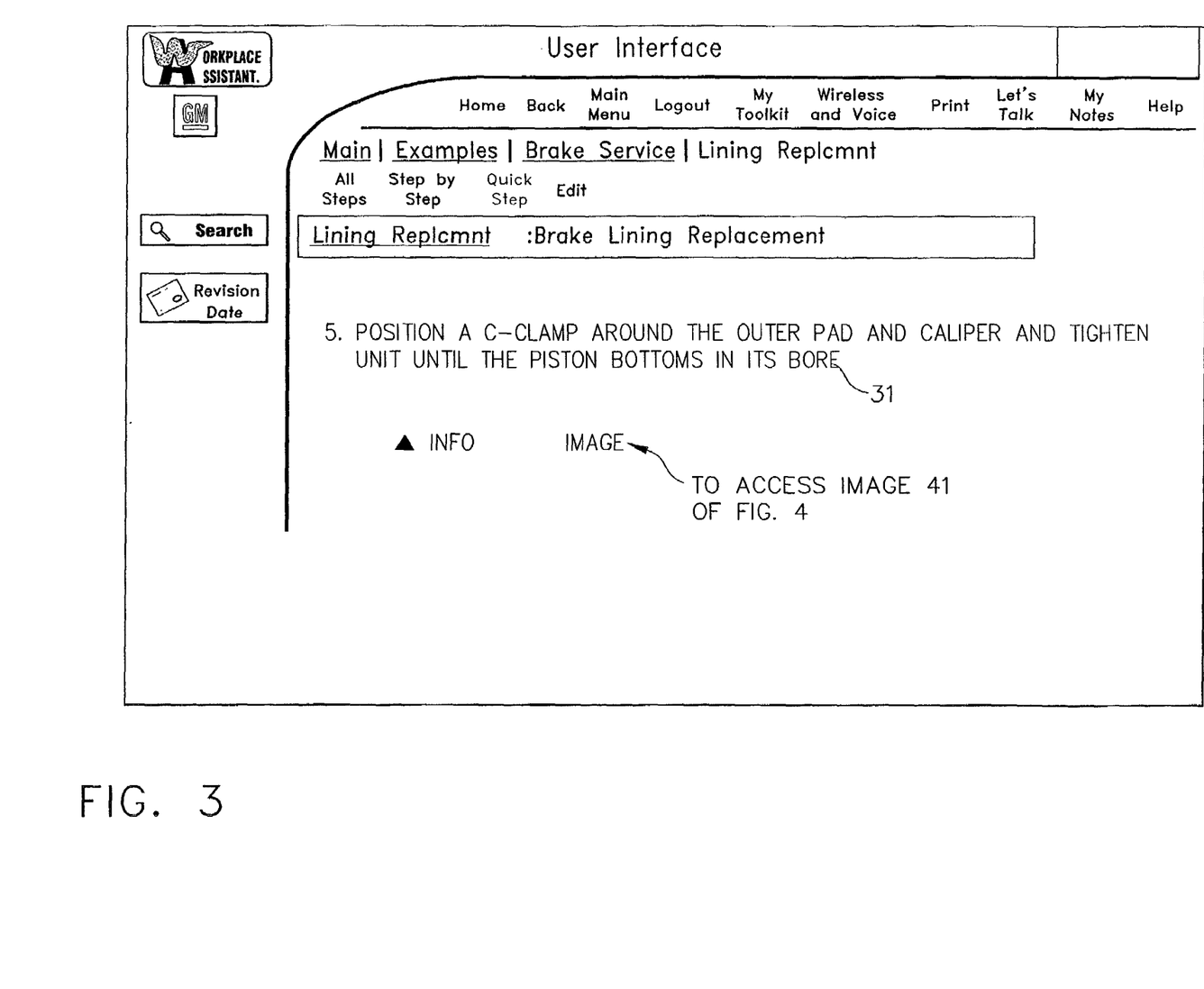
FIG. 3 is an example of a display generated with an action data object according to a preferred exemplary embodiment of the present invention.

More specifically, and with reference to FIG. 2, the action data 26 stored by the memory 22 preferably comprises one or more action data objects 38 that each describes a single activity and/or task of the procedure. The action data objects 38 are preferably generated, modified, and/or revised by an operator, administrator, and/or user (hereinafter referred to collectively as a "user") of Workplace Assistant™ that is the data object owner of one or more of the action data objects 38. The data object owner as used herein shall mean a person and/or entity that is granted the ability to generate, modify, and/or revise a data object of the performance support data 24. The action data objects 38 are also preferably stored in the memory 22 with a unique identifier (i.e., a unique designation or name), a track, description, and identifier of the data object owner, creation date, last modification date, details, and/or related information (i.e., meta data, which in general terms is information about a data object as well known by those of ordinary skill in the art). For example, and with reference to FIG. 3, an action data object 38 could provide an action for a single activity and/or task of a brake lining replacement procedure such as "Position a C-Clamp around the outer pad and calipers until the piston bottoms in its bore" 31. However, any single step and/or task of any number of procedures can be an action data object 38 in accordance with the present invention.

Figure 4:
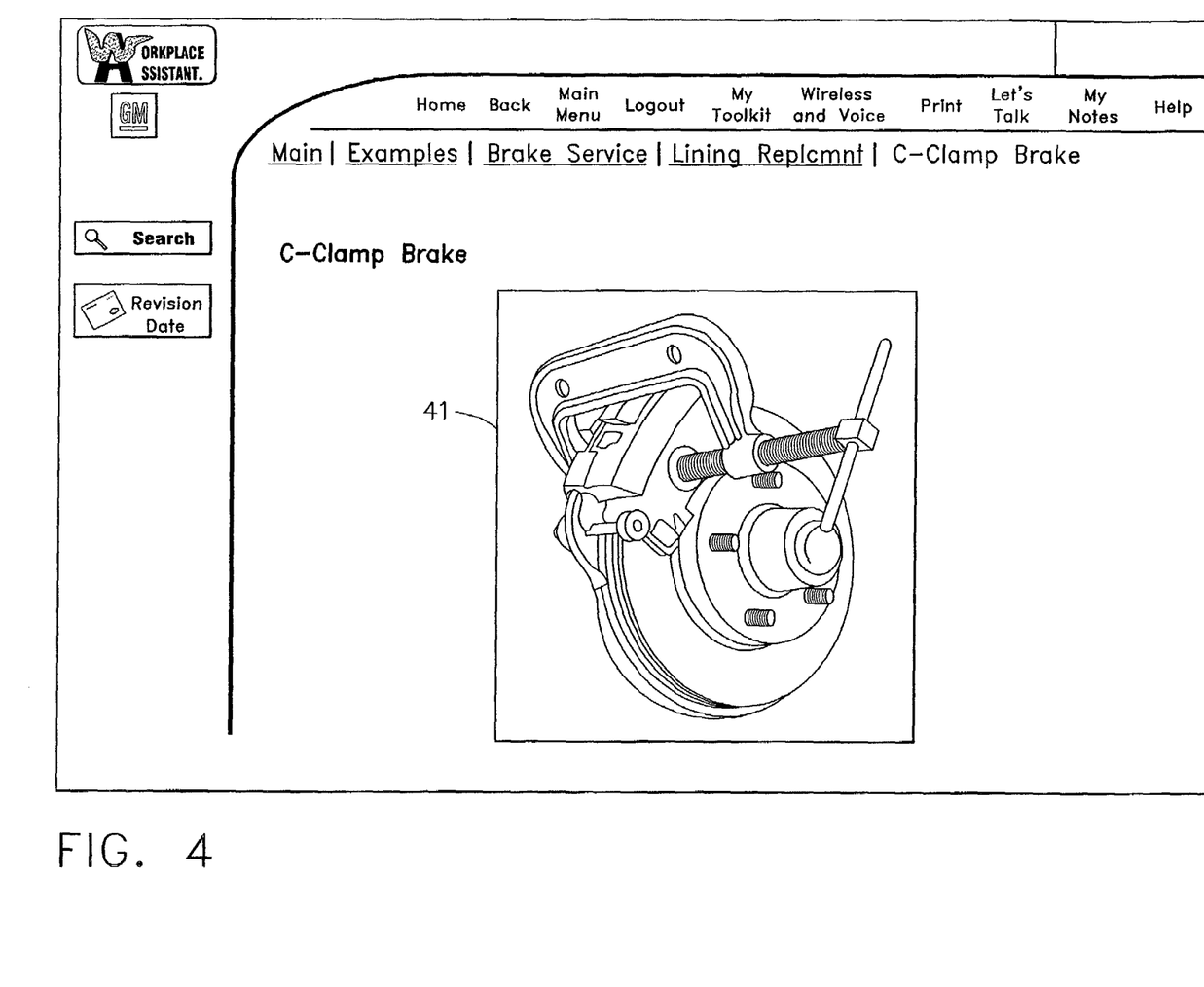
FIG. 4 is an example of a display generated with a resource data object according to a preferred exemplary embodiment of the present invention.

The resource data 28 of the performance support data 24 provides a resource for the procedure and the resource data 28 is preferably one or more resource data objects 40, with each of the resource data objects containing one or more steps, actions, and/or tasks of the procedure. The one or more resource data objects 40 preferably provide at least one stand-alone element or at least one building block for assembly data 26 or procedure data 34 as subsequently described this detailed description of the drawings. The resource data objects 40 are preferably generated, modified, and/or revised by a user of Workplace Assistant™ that is the data object owner of one or more of the resource data objects 40, with the generation, modification and/or revision of a resource data object 40 at least involving designation of a file stored in the memory 22. However, the data object owner of one or more of the resource data objects can also generate, modify or revise the file according to the present invention. As with the action data objects 38, the resource data objects 40 are also preferably stored in the memory 22 with a unique identifier (i.e., a unique designation or name), a track, a description, an identifier of the data object owner, a creation date, a last modification date, and/or resource type (i.e., meta data), such as ".pdf", ".gif", ".jpg", ".xls", ".doc", ".dxf", ".fla", ".swf", ".ppt", and the like. However, the resource data objects 40 can have any number of file formats. For example and with reference to FIG. 4, an image 41 is provided with a resource data object 40 that shows the position of a C-Clamp for the action data object of FIG. 3 (i.e., "Position a C-Clamp around the outer pad and calipers until the piston bottoms in its bore"). However, any number of formats as stand-alone elements or building blocks can be resource data objects 40 of the resource data 28 in accordance with the present invention.

Referring to FIG. 1 and FIG. 2, the reference data 30 of the performance support data 24 is preferably one or more reference data objects 42 that set forth an address or links to data 32 other than the performance support data 24 stored in the memory 22, including hyperlinks to other web pages or web sites on the intranet or the internet. The reference data objects 42 are preferably generated, modified, and/or revised by a user of Workplace Assistant™ that is the data object owner of one or more of the reference data objects 42. The reference data objects 42 can have any number of formats such as a Uniform Resource Locator (URL) format (e.g., File Transfer Protocol (FTP), HyperText Transfer Protocol (HTTP), Gopher Protocol (Gopher), Electronic Mail (Mailto), Usenet News (News), Telnet to Remote Host (Telnet), Telnet to Remote Host Requiring 3270 Emulation (TN3270), Wide Area Information Search (WAIS), Host Specific File Names (File), Usenet News using NNTP Access (NNTP), and Prospero Directory Service (Prospero). For example, a reference data object 42 could provide a URL for a web site of a brake manufacture or automobile manufacturer and a specific page of the web site for brake fluid specifications within the master cylinder. The reference data objects 40 are preferably stored in the memory 22 with a unique identifier (i.e., a unique designation or name), a track, a description, an identifier of the data object owner, a creation date, a last modification date, details, and/or the URL, FTP, HTTP, etc., as previously described in this detailed description of the drawings. However, other information or attributes can be provided with the reference data objects 42 and any number of addresses and/or links can be reference data objects 42 of the reference data 28 in accordance with the present invention.

Figure 5:
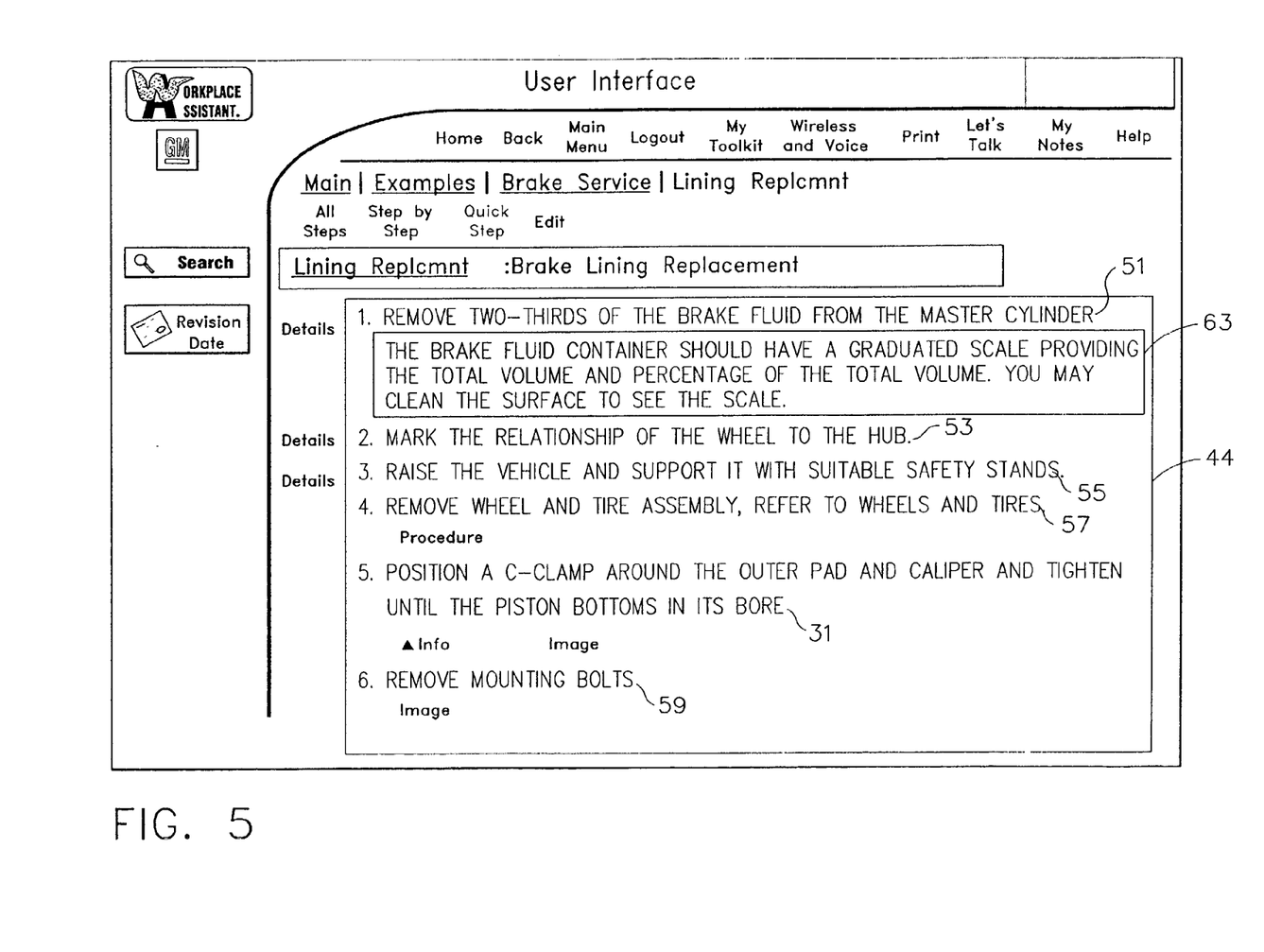
FIG. 5 is an example of a display generated with a procedure data object according to a preferred exemplary embodiment of the present invention.

The procedure data 34 of the performance support data 24 describes a series of activities and the procedure data 34 preferably comprises procedure data objects 44 that comprise multiple steps, actions, activities and/or tasks of the procedure and more preferably contain a series of steps, actions, and/or tasks. Preferably, each step, action, and/or task of the procedure data objects 44 is an action data object (i.e., a complete stand-alone data object). The procedure data objects 44 are preferably generated, modified, and/or revised by a user of Workplace Assistant™ that is the data object owner of one or more of the procedure data objects 44. As with the action data objects 38 and the resource data objects 40, the procedure data objects 44 are preferably stored in the memory 22 with a unique identifier (i.e., a unique designation or name), a breadcrumb, a description, an identifier of the data object owner, a creation date, a last modification data, details, and/or related information. For example, and with reference to FIG. 5, a procedure data object 44 could provide for the a first action 51, a second action, 53, a third action 55, a fourth action 57, a fifth action 59, and a sixth action 61 of a brake lining replacement procedure, with an action data object providing each of the single actions of the procedure, such as the action data object previously described with reference to FIG. 3. In addition, the procedure data object 44 presented in this example presents at least one textual document 63, provided by a resource data object, with additional details of the first action 51. However, any number of data formats and combinations of resource data objects 40, reference data objects 42, and other procedure data objects 44 can be procedure data objects 44 of the performance support data 24 in accordance with the present invention.

Figure 6:
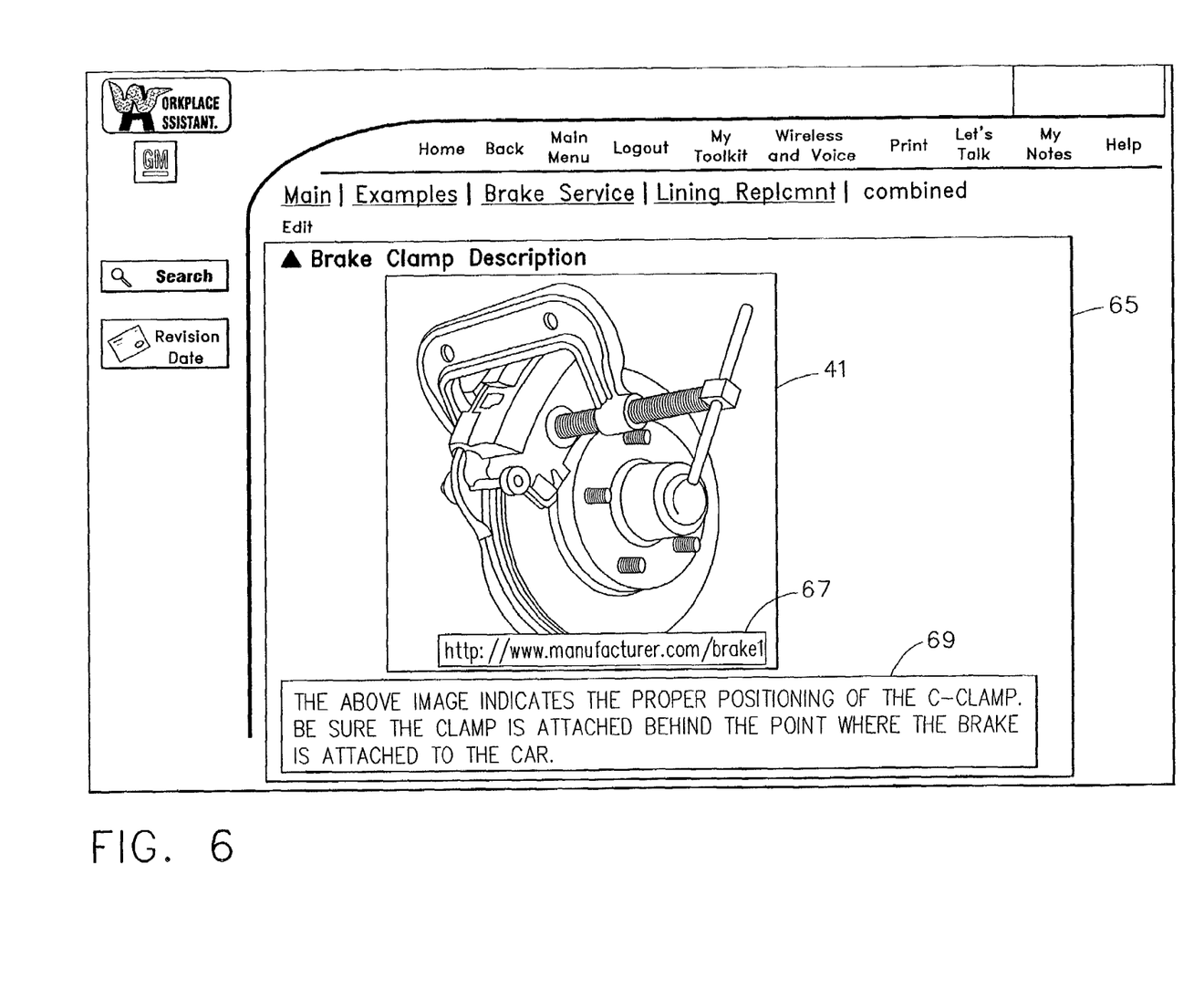
FIG. 6 is an example of a display generated with an assembly data object according to a preferred exemplary embodiment of the present invention.

Continuing with FIG. 1 and FIG. 2, the assembly data 36 of the performance support data 24 is preferably one or more assembly data objects 46 that contain a combination of text and images that are assembled to provide a visual presentation related to the procedure. The assembly data 36 preferably comprises assembly data objects 46 having one or more text blocks or images, and can also include a subset of the resource data objects 40 that provide such text blocks or images. The assembly data objects 46 are preferably generated, modified, and/or revised by a user of Workplace Assistant™ that is the data object owner of one or more of the assembly data objects 46. One or more assembly data objects 46 can have text blocks and links to other files and any number of formats such as ".pdf", ".gif", ".jpg", ".xls", ".doc", ".dxf", ".fla", ".swf", ".htm", ".ppt", and the like. Files with certain formats such as ".gif", ".jpg", and ".png" can be imbedded in the visual presentation of the assembly data and certain formats can provide active links that when activated, launch a software application for viewing and manipulating the activated file type. As with the action data objects 38, the resource data objects 40, and the procedure data objects 44, the assembly data objects 46 are preferably stored in the memory 22 with a unique identifier (i.e., a unique designation or name), a breadcrumb, a description, an identifier of the data object owner, a creation date, a last modification data, details, and/or related information. For example, and with reference to FIG. 6, an assembly data object 65 can comprise the image 41 previously provided as an example in FIG. 4, an embedded reference data object 67 (i.e., a URL for a manufacture description of the brake clamp), and a resource data object 69 providing a textual description of the image. However, any number of data formats and combinations of resource data objects 40, reference data objects 42, and procedure data objects 44 can comprise the assembly data object 46 of the performance support data 24 in accordance with the present invention.

Referring to FIG. 1, at least one processor 48 is coupled to the memory 22, which can comprise multiple memories designated as the memory 22. The processor 48 can encompass one or more functional blocks and also include any number of individual microprocessors, memories, storage devices, interface cards, and other processor components. The processor 48 is configured to access the memory 22, retrieve the performance support data 24, and assemble the performance support data 24 to form the procedure. More preferably, the processor 48 is configured to access the memory 22, retrieve action data 26, resource data 28, reference data 30, procedure data 34 and assembly data 36, and assemble this data (26,28,30,34,36) to form the procedure. Even more preferably, the processor is configured to access the memory 22, retrieve one or more of the action data objects 38, resource data objects 30, reference data objects 42, procedure data objects 44, and assembly data objects 46, and assembly one or more of these data objects (38,40,42,44,46) to form the procedure.

The processor 48 is preferably coupled to the memory 22 using a first network 50 that is preferably an intranet. In addition, the processor 48 can be coupled to the memory 22 using a second network 52 that is preferably the internet. Furthermore, the processor 48 can be coupled to the memory 22 using the first network 50 or the second network 52, or the first network 50 and the second network 52. However, the processor 48 can also be coupled to the memory using networks in addition to the first network 50 and/or second network 52.

The processor 48 is also coupled to a display 54. The display 54 can be any current and future display, and is preferably a color display and more preferably a multi-color display. For example, the display 54 can be a color Cathode Ray Tube (CRT) display, monochrome CRT display, Liquid Crystal Display (LCD) display, plasma display, Flat-Panel display (FPD), electro-luminescent display, vacuum fluorescent display, Light Emitting Diode (LED) display, or the like. The display 54 is configured to produce a Graphical User Interface (GUI) 56 that visually presents the procedure assembled by the processor 48.

As well understood by those of ordinary skill in the art, the user or users 58 preferably provide input to the processor 48 with an input device 34. The input device 34 can be any device suitable for accepting input from a user 58 of the apparatus 20, such as a cursor control device (e.g., touchpad, joystick, mouse, trackball) and/or alphanumeric keyboard, for example. In addition, the input device 34 can be an integrated component of the display 54, such as a touch screen. The input device 34 provides the ability for the user or users 58 to control the visual presentation of the GUI, thereby allowing the user or users 58 of the apparatus 20 to select the on-the-job performance support or a portion thereof for the procedure or edit and manage performance support data 24.

Figure 7:
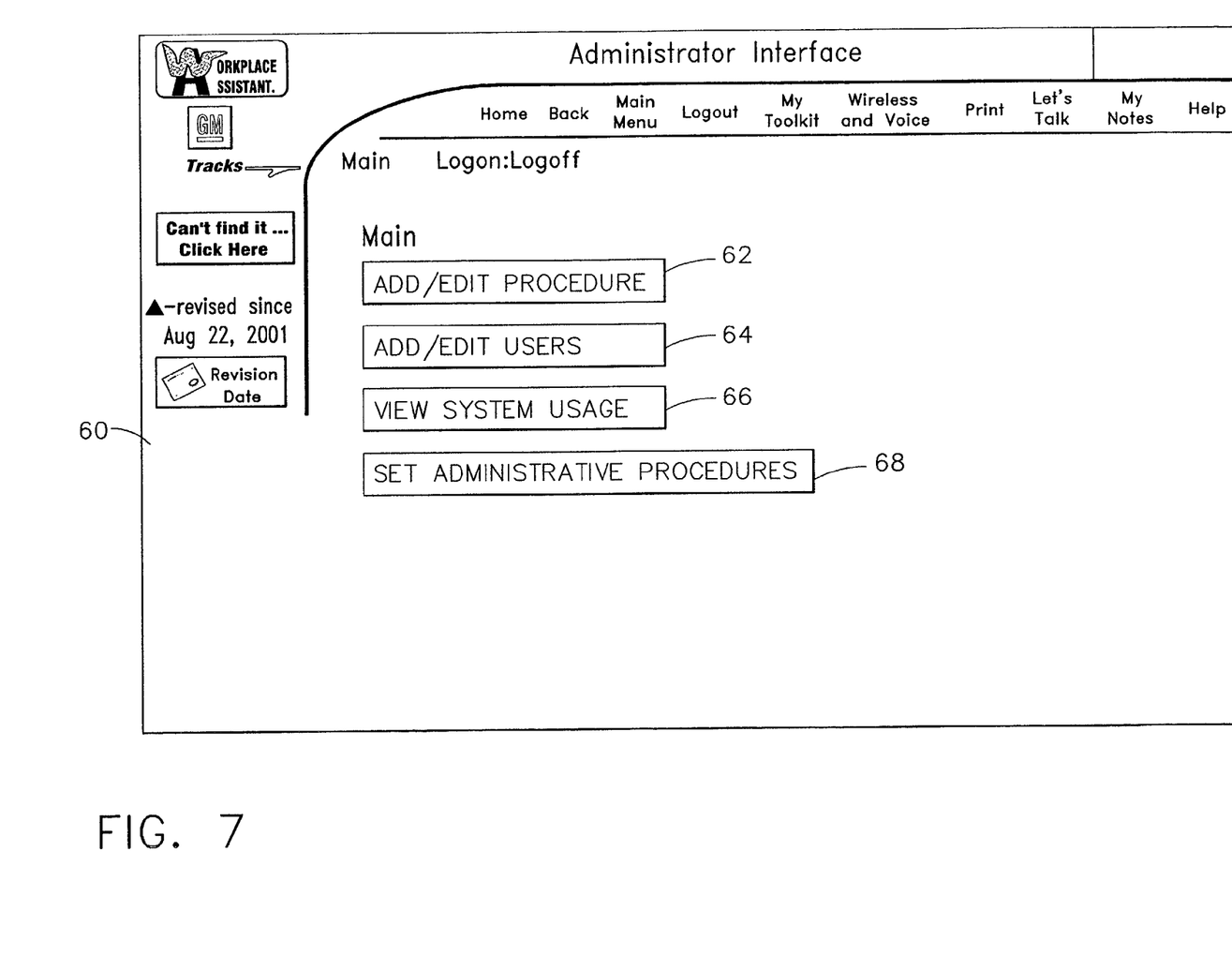
FIG. 7 is the administrator interface of the apparatus according to a preferred exemplary embodiment of the present invention

Referring to FIG. 7, an administrator interface 60 (i.e., administrator GUI) is illustrated as the GUI 56 of FIG. 1. The administrator interface 60 provides one of at least two interfaces of the apparatus 20. In addition to other administrative functions as subsequently discussed in this detailed description of the drawings, the administrator interface 60 provides the ability to create and modify the action data 26, resource data 28, reference data 30, procedure data 34, and assembly data 36 with a menu driven environment operating in conjunction with a browser of the first network and/or second network and/or other networks. More preferably, the administrator interface 60 provides the ability for each object owner to create and modify the action data objects 38, resource data objects 40, reference data objects 42, procedure data objects 44, and assembly data objects 46 with a menu driven environment operating in conjunction with a browser of the first network and/or second network and/or other networks. As used herein, "browser" shall mean a software application, hardware, or a combination thereof, that interprets the programming language of the first network 50, second network 52, and/or third network (e.g., HTML, XML, and other hypertext markup languages) into text, symbols, graphics, and audio that the user can view, listen, and interact with when accessing the network(s). While one view with one selection and view of options for the administrator interface 60 is illustrated in FIG. 7, the administrator interface 60 as shown in FIG. 7 can be presented with any number of views and options.

As used in this description of the present invention, the administrator is a user or users assigned to update the performance support data 24 as illustrated and described in conjunction with FIG. 1 and FIG. 2. The administrator interface 60 allows the administrator to select the procedure to edit and enter a user name and preferably a password to permit alteration of the procedure. Once the administrator has logged into the system, the administrator can select from the following options as subsequently described with the selection of an "Add/Edit Procedure" virtual button 62, an "Add/Edit User" virtual button 64, a "View System Usage" virtual button 66, and a "Set Administrative Procedures" virtual button 68. While these four (4) capabilities and options are presented in this detailed description of the drawings, other capabilities and options can be presented by the administrator interface 60 in addition to the capabilities and options that provide for the following:

1. Add/Edit Procedures
   The "Add/Edit Procedures" function provides the capability to update procedures and additional information (i.e., update performance support data and organization thereof); which can include "embedded performance support" and "performance support refreshers."

2. Add/Edit Users
   The "Add/Edit Users" function provides the capability to the update the list of users that can access the apparatus from an administrative perspective as well as an end user perspective.

3. View System Usage
   The "View System Usage" function provides the capability to monitor utilization of the apparatus 20 and also the capability to monitor what procedures are being accessed as well as comments from a user or users.

4. Set Administrative Procedures
   The "Set Administrative Procedures" function provides the capability to set the properties for the system (e.g., the interface that is presented to a user for a particular configuration of the apparatus 20).

Figure 8:
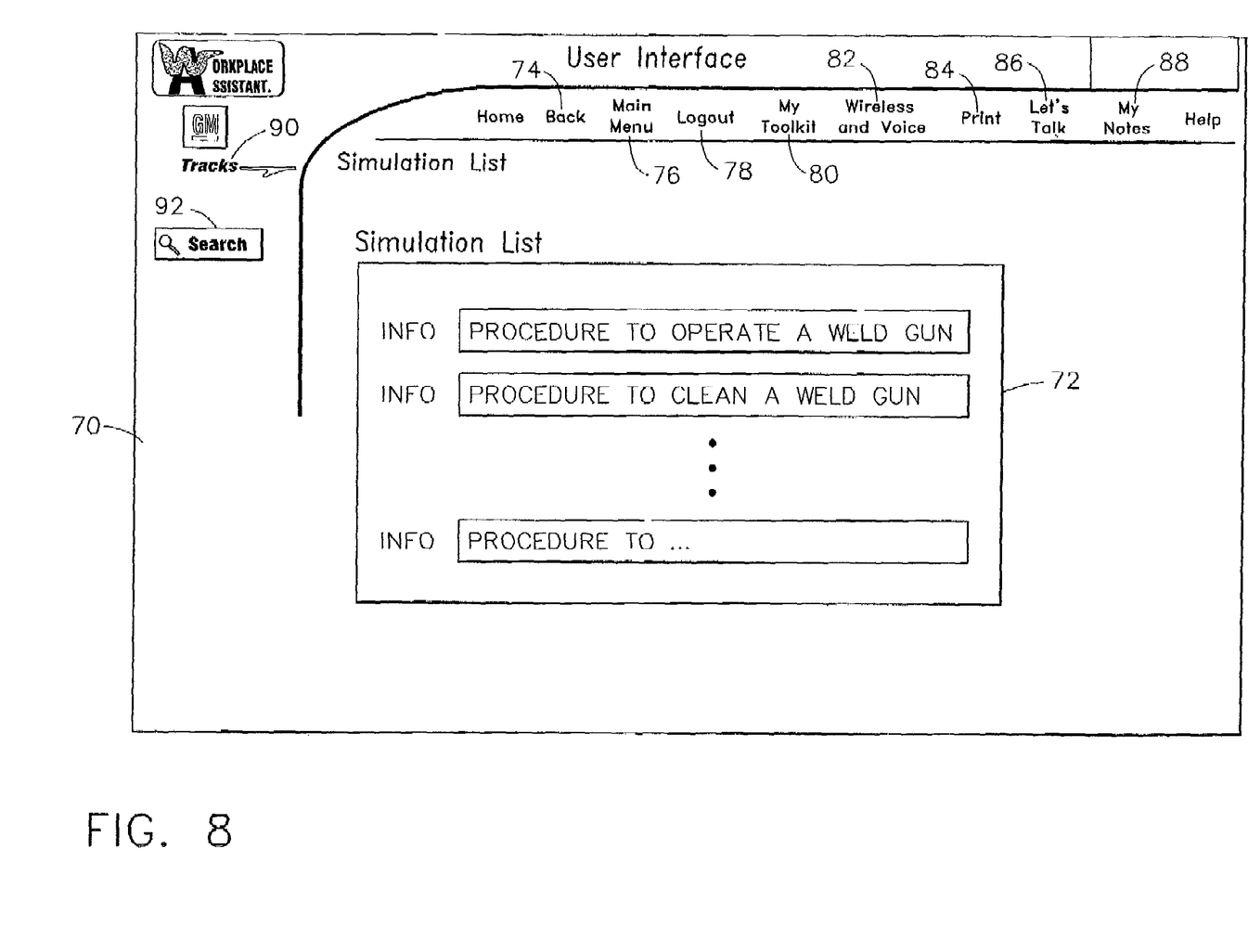
FIG. 8 is the user interface of the apparatus according to a preferred exemplary embodiment of the present invention.

Referring to FIG. 8, a user interface 70 (i.e., a user GUI) is illustrated as the GUI 56 of FIG. 1. The user interface 70 provides the second of the at least two interfaces of the apparatus 20. While one view with capabilities and options for the user interface 70 is illustrated in FIG. 8, the user interface 70 can be presented with any number of capabilities and options in any number of views and formats.

The user is the individual accessing performance support through the apparatus of the present invention for a selected procedure. The user interface 70 presents a list of procedure selections 72, which is dynamically generated based upon access and retrieval by the processor of performance support data from the memory. The user can "drill down" through the procedure selections 72 in a manner somewhat analogous to Internet navigators to access a specific procedure. Once a specific procedure is accessed and retrieved by the processor, the user is displayed with links to any "embedded performance support," which is information that clarifies the textual or pictorial or video description presented for the apparatus as set forth in the performance support data.

The user can also select from a group of options that are available to the user with the selection of virtual buttons presented by the user interface 70. The group of the following capabilities and options is presented as an example only and other capabilities and options are within the scope of the present invention:

1. "Back" upon activation of the Back Virtual Button 74 The Back option returns the user to the previous screen.

2. "Main Menu" upon activation of the Main Menu Virtual Button 76
   The Main Menu option loads the initial or default view of the user interface 70.

3. "Login/Logout" upon activation of the Login/Logout Virtual Button 78
   The apparatus is preferably configured to allow an individual to view the content presented by the apparatus in an anonymous fashion. In some instances, Workplace Assistant can be user is identified in the system. For example, a person note with the "My Notes" capability as subsequently described provides increased utility if the user is identified by the apparatus.

4. "My Toolkit" upon activation of the My Toolkit Virtual Button 80
   The "My Toolkit" capability is generally available only to those users that have logged into Workplace Assistant™. This capability presents the user with options to update personal information. For users owning content, a sub-screen is presented that allows the user to navigate through the editing process.

5. "Wireless/Voice" upon activation of the Wireless/Voice Virtual Button 82

The Wireless capability of the Wireless/Voice capability will allow the user to export content for display on a Personal Data Assistant (PDA) or the like. In addition, the Voice capability of the Wireless/Voice capability will allow the user to listen to information presented by Workplace Assistant™ and also provide audible commands and accept dictated notes.

6. "Print" upon activation of the Print Virtual Button 84

The print capability provides the user the capability of printing from within Workplace Assistant™. In most instances, the print capability displays a print dialog box. However on procedure pages, the print capability preferably allows the user to customize the information transmitted for printing. The user has the option to print one or more of the personal notes, notice, and step details.

7. "Let's Talk" upon activation of the Let's Talk Virtual Button 86

Generally, the performance support data stored in the memory has a designated owner or subject matter expert. The Let's Talk capability provides a communication conduit for the user to communicate with the content owner. The Let's Talk capability provides an interface for preparing and transmitting an electronic message.

8. "My Notes" upon activation of the My Notes Talk Virtual Button 88

The My Notes capability allows a user to associate personal notes with the content presented by Workplace Assistant™ (i.e., other users will not see the notes when reviewing a procedure). However, the option is provided with the My Notes capability to designate one or more of the personal notes as public so that other users can view the notes personally generated by another user.

9. "Tracks" upon activation of the Tracks Virtual Button 90

The tracks capability provides a navigation feature in Workplace Assistant™. More specifically, the tracks capability provides a historical progression of the views presented to the user. Preferably, the tracks capability displays the current page presented to the user and the hyperlinks to previous views visited by the user, preferably in a sequential order.

10. "Search" upon activation of the Search Virtual Button 92

The search capability allows the user to search Workplace Assistant™ for specific information contained within the performance support data stored in the memory. Preferably, the search can be conducted using key work techniques, including inclusion or exclusion of specific data strings, or by a unique procedure identifier identifying a procedure or a sub-procedure of a procedure.

Referring to FIG. 1 and from the foregoing detailed description of the drawings, it should be appreciated that the apparatus 20 provides a multi-tiered approach to on-the-job performance support of a procedure. In the apparatus 20, the performance support data (i.e., the procedural information) is independent of the display producing the GUI and also independent of the logic (i.e., the code that drives the apparatus 20). As can be appreciated by one of ordinary skill in the art, the substantially similar and preferably the same construction of the memory preferably organized as a database provides user access to performance support for a variety of procedures, tasks, and duties. For example, a user can access performance support for entering time card information and then switch to another menu item describing the troubleshooting activities of a robotic system fault using the same tool, same navigation, and different data. The apparatus 20 of the present invention allows a user to access multiple systems with an interface designed for various environments. For example, the apparatus can be used to support operation of a weld gun and in another instance used to support a paint robot. The performance support data 24 associated with the weld gun could be accessed from a factory floor using a touch screen that provides larger buttons with larger text as compared to buttons and text that are accessed from an office environment by an engineer.

Figure 9:
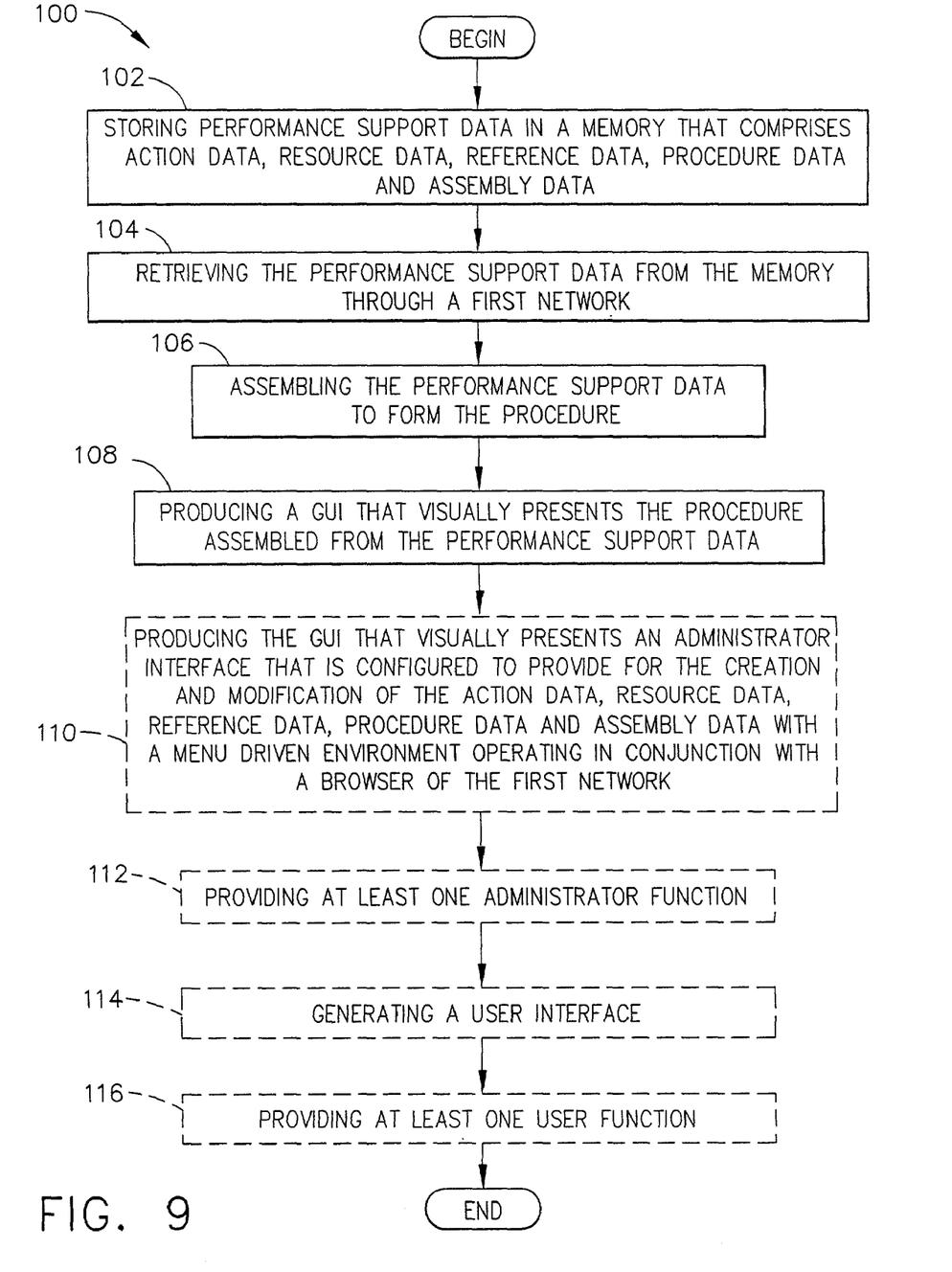
FIG. 9 is a method for providing on-the-job performance support of a procedure according to a preferred exemplary embodiment of the present invention.

As can be appreciated by one of ordinary skill in the art, the apparatus 20 for providing on-the-job performance support of a procedure as previously described in this detailed description of preferred embodiments provides numerous benefits, and the method for providing on-the-job performance 100 as shown in FIG. 9, which can be performed with the apparatus or any other apparatus or combination of apparatuses, provides one or more of the benefits of the apparatus 20 as well as other benefits as can be appreciated by one of ordinary skill in the art.

Referring to FIG. 9, the method for providing on-the-job performance support of a procedure 100 is illustrated according to a preferred exemplary embodiment of the present invention. The method 100 comprises storing performance support data in a memory 102. Preferably, the performance support data comprises action data, resource data, reference data, resource data, and assembly data, and the action data, resource data, reference data, resource data, and assembly data preferably comprise action data objects, resource data objects, reference data objects, resource data objects, and assembly data objects, respectively, as previously described in this detailed description of the drawings. In addition, the method 100 comprises retrieving the performance support data from the memory 104. Furthermore, the method 100 comprises assembling the performance support data to form the procedure 106 and producing a GUI that visually presents the procedure assembled from the performance support data 108.

In accordance with a preferred exemplary embodiment of the present invention, the method 100 further comprises generating an administrator interface 110 and providing at least one administrator function 112. For example, the administrator function can be the "Add/Edit Procedures" function, the "Add/Edit Users" function, the "View System Usage" function, and the "Set Administrative Procedures" function as previously described in this detailed description of the drawings. However, it should be understood that other administrator functions or a subset of these administrator functions can be provided according to the present invention.

In accordance with another preferred exemplary embodiment of the present invention, the method 100 further comprises generating a user interface 114 and providing at least one user function 116. For example, the user function can be the "Back" function, the "Main Menu" function, the "Login/Logout" function, the "My Toolkit" function, the "Wireless/Voice" function, the "Print" function, the "Let's Talk" function, the "My Notes" function, the "Tracks" function, and the "Search" function as previously described in this detailed description of the drawings. However, it should be understood that other user functions or a subset of these user functions can be provided according to the present invention.

It should also be appreciated from the foregoing detailed description of the drawings that methods and apparatus are provided for on-the-job performance support. While a preferred exemplary embodiment had been presented in the foregoing detailed description of the drawings, it should be appreciated that a vast number of variations exist. It should also be appreciated that this preferred exemplary embodiment is only an example, and it is not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in the detailed description of the drawings without departing from the spirit and scope of the invention as set forth in the appended claims.

The invention claimed is:

1. An apparatus for providing on-the-job performance support of a procedure, the apparatus comprises:
    a memory configured to store performance support data, said performance support data comprising action data objects, resource data objects, reference data objects, procedure data objects, and assembly data objects, each data object associated with a data object owner that has a specified identity stored in said memory;
    a processor coupled to said memory with a first network operating in a first programming language and a second network in a second programming language, said first network comprising the internet, said second network comprising an intranet, said processor configured to access said memory using at least one of said first network and said second network and retrieve said performance support data, said processor further configured to assemble said performance support data to form the procedure;
    a browser coupled to at least one of said first and second networks, said browser capable of interpreting said first programming language and said second programming language; and
    a display coupled to said processor, said display configured to produce a Graphical User Interface(GUI) that visually presents the procedure assembled by said processor, said display further configured to operate with said browser to produce said GUI that visually presents an administrator interface, said administrator interface configured to provide for the creation and modification of said action data objects, resource data objects, reference data objects, procedure data objects, and assembly data objects with a menu driven environment operating in conjunction with said browser, each data object capable of being modified by the data object owner that has said specified identity via the administrator interface wherein the apparatus is configured to allow said data object owner that has said specified identity to modify said data object by editing said memory in which said data object is stored.

2. The apparatus for providing on-the-job performance support of the procedure of claim 1, wherein each of said action data objects describes a single activity of the procedure.

3. The apparatus for providing on-the-job performance support of the procedure of claim 1, wherein each of said reference data objects sets forth an address to data other than the performance support data stored in said memory.

4. The apparatus for providing on-the-job performance support of the procedure of claim 1, wherein each of said procedure data objects provides a series of actions for the procedure.

5. The apparatus for providing on-the-job performance support of the procedure of claim 1, wherein each of said assembly data objects provides a combination of text and images that are assembled to provide a visual representation of the procedure.

6. The apparatus for providing on-the-job performance support of the procedure of claim 2, wherein said administrator interface is configured to provide the ability for said associated data object owner to create and modify said action data object with a menu driven environment operating in conjunction with said browser.

7. The apparatus for providing on-the-job performance support of the procedure of claim 1, wherein said GUI is configured to provide a user interface.

8. A method for providing on-the-job performance support of a procedure, the method comprises:
    storing performance support data in a memory, said performance support data comprising action data objects, resource data objects, reference data objects, procedure data objects, and assembly data objects, each data object associated with a data object owner that has a specified identity stored in said memory;
    retrieving said performance support data from said memory through at least one of a first network operating in a first programming language and a second network operating in a second programming language, said first network comprising the internet and said second network comprising an intranet;
    assembling said performance support data to form the procedure;
    using a browser capable of interpreting said first and second programming languages to provide a Graphical User Interface (GUI) that visually presents the procedure assembled from said performance support data; and
    using said browser capable to produce said GUI that visually presents an administrator interface that is configured to provide for the creation and modification of said action data objects, resource data objects, reference data objects, procedure data objects, and assembly data objects by a data object owner that has said specified identity with a menu driven environment operating in conjunction with said browser, wherein said modification by said data object owner having said specified identity is made by editing said memory in which said data object is stored.

9. The method for providing on-the-job performance support of the procedure of claim 8, further comprising providing at least one administrator function with said administrator interface.

10. The method for providing on-the-job performance support of the procedure of claim 8, further comprising generating a user interface.

11. The method for providing on-the-job performance support of the procedure of claim 10, further comprising providing at least one user function with said user interface.

12. The method for providing on-the-job performance support of the procedure of claim 8, wherein each of said action data objects describes a single activity of the procedure.

13. The method for providing on-the-job performance support of the procedure of claim 8, wherein each of said reference data objects sets forth an address to data other than the performance support data stored in said memory.

14. The method for providing on-the-job performance support of the procedure of claim 8, wherein each of said procedure data objects provides a series of actions for the procedure.

15. The method for providing on-the-job performance support of the procedure of claim 8, wherein each of said assembly data objects provides a combination of text and images that are assembled to provide a visual representation of the procedure.

16. An apparatus for providing on-the-job performance support of a procedure, the apparatus comprises:
- a memory configured to store performance support data, said performance support data comprising:
  - action data, said action data comprises action data objects with each of said action data objects describing a single activity of the procedure;
  - resource data, said resource data comprises resource data objects;
  - reference data, said reference data comprises reference data objects with each of said reference data objects setting forth an address to data other than the performance support data stored in said memory;
  - procedure data, said procedure data comprises procedure data objects with each of said procedure data objects providing a series of actions for the procedure; and
  - assembly data said assembly data comprises assembly data objects with each of said assembly data objects providing a combination of text and images that are assembled to provide a visual representation of the procedure;
- wherein each of said data objects is associated with a data object owner that has a specified identity stored in said memory;
- a processor coupled to said memory with a first network operating in a first programming language and a second network in a second programming language, said first network comprising the internet, said second network comprising an intranet, said processor configured to access said memory using at least one of said first network and said second network and retrieve said performance support data, said processor further configured to assemble said performance support data to form the procedure;
- a browser coupled to at least one of said first and second networks, said browser capable of interpreting said first programming language and said second programming language; and
- a display coupled to said processor, said display configured to produce a Graphical User Interface (GUI) that visually presents the procedure assembled by said processor to form the procedure, said display further configured to operate with said browser to produce said GUI that visually presents an administrator interface, said administrator interface configured to provide the ability for said data object owner to create and modify said action data objects, said resource data objects, said reference data objects, said procedure data objects, said assembly data objects with a menu driven environment operating in conjunction with said browser, wherein the apparatus is configured to allow said data object owner having said specified identity to modify said data object by editing said memory in which said data object is stored.

\* \* \* \* \*